UNITED STATES PATENT OFFICE.

OSCAR DRESSEL, OF ELBERFELD, AND RICHARD KOTHE AND HEINRICH HOERLEIN, OF VOHWINKEL, GERMANY, ASSIGNORS TO FARBENFABRIKEN VORM. FRIEDR. BAYER & CO., OF ELBERFELD, GERMANY, A CORPORATION OF GERMANY.

DYESTUFF.

978,439.　Specification of Letters Patent.　Patented Dec. 13, 1910.

No Drawing.　Application filed May 19, 1910.　Serial No. 562,283.

*To all whom it may concern:*

Be it known that we, OSCAR DRESSEL, RICHARD KOTHE, and HEINRICH HOERLEIN, citizens of the German Empire, and residing, respectively, at Jägerstrasse 18, Elberfeld; Bismarckstrasse 97, Vohwinkel, and Bismarckstrasse 93, Vohwinkel, Germany, have invented new and useful Improvements in Dyestuffs, of which the following is a specification.

Our invention relates to the manufacture and production of new azo dyestuffs suitable for dyeing wool which are obtained by combining the diazo compounds of aminoarylsulfonamids with sulfonic acids of alpha-methylindol compounds, especially sulfonic acids of methylketol ($Pr_2$-methylindol), $Pr_{1a}$-2-dimethylindol, $B_3$-$Pr_2$-dimethylindol or other of the sulfonic acids of alpha-methylindol compounds described in British Letters Patent 12444/02. The nomenclature used for the above substances is the modern one adopted for the indolmolecule namely:

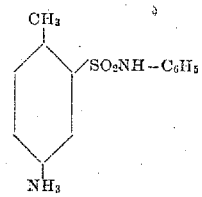

(See Winther Vol. II page 478).

The new dyestuffs are after being dried and pulverized in the shape of their alkalin salts from yellow to orange powders soluble in water and in concentrated sulfuric acid with a yellow color; yielding upon reduction with stannous chlorid and hydrochloric acid an aminoarylsulfonamid and an amino-alpha-methylindol sulfonic acid. They dye wool in yellow shades which are remarkable for their excellent fastness to milling, washing and light.

In order to illustrate the new process more fully the following example is given, the parts being by weight:—26.2 parts of 4-toluidin-2-sulfonanilid:

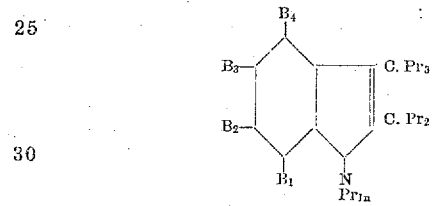

are diazotized with 30 parts of HCl (19° Bé.) and 6.9 parts of sodium nitrite. The diazo compound is then added to an acid solution of alpha-methylindol sulfonic acid prepared from 13.1 parts of alpha-methylindol (see British Letters Patent 12444/02). It is stirred until the production of the dyestuff will be completed. The new coloring matter is filtered off, dissolved in a sodium carbonate solution, salted out, filtered off and dried. It is after being dried and pulverized in the shape of its sodium salt a yellow powder, soluble in water and in concentrated sulfuric acid with a yellow color. It dyes wool from acid baths brilliant yellow even shades fast to light and to milling. Upon treatment with stannous chlorid and hydrochloric acid it is split up, 4-toluidin-2-sulfonanilid and amino-alpha-methylindol sulfonic acid being obtained.

The process is carried out in an analogous manner on using other sulfonamids *e. g.* ortho-anisidin-para-sulfonanilid

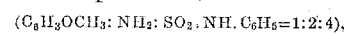

ortho-toluidin-para-sulfontoluidid

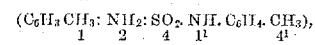

ortho-chloro-anilin-para-sulfon-xylidid

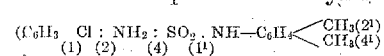

4-toluidin-2-sulfonyl-1-naphthylamin-4 or 5-sulfonic acid, 4-toluidin-2-sulfonyl-para-sulfanilic acid, 4-toluidin-2-sulfonyl-meta-sulfanilic acid. The new dyes can also be obtained by first combining the above mentioned diazo compounds with such of the above mentioned methylketols which do not contain sulfonic groups and then sulfonating the dyes.

We claim:—

1. The herein described new dyestuffs obtainable by reacting upon sulfonic acids of alpha-methylindol compounds with diazotized aminoarylsulfonamids, which dyes are after being dried and pulverized in the shape of their alkaline salts from yellow to orange-yellow powders soluble in water and in concentrated sulfuric acid with a yellow color; yielding upon treatment with stannous chlorid and hydrochloric acid an aminoarylsulfonamid and an amino-alpha-methylindol sulfonic acid and dyeing wool from acid baths yellow shades, substantially as described.

2. The herein described new dyestuff obtainable by reacting upon alpha-methylindol sulfonic acid with diazotized 4-toluidin-2-sulfonanilid, which is after being dried and pulverized a yellow powder soluble in water and in concentrated sulfuric acid with a yellow color; yielding upon reduction with stannous chlorid and hydrochloric acid 4-toluidin-2-sulfonanilid and amino-alpha-methylindol sulfonic acid and dyeing wool from acid baths brilliant yellow shades, substantially as described.

In testimony whereof we have hereunto set our hands in the presence of two subscribing witnesses.

OSCAR DRESSEL. [L. S.]
RICHARD KOTHE. [L. S.]
HEINRICH HOERLEIN. [L. S.]

Witnesses:
OTTO KÖNIG,
CHAS. J. WRIGHT.

---

It is hereby certified that in Letters Patent No. 978,439, granted December 13, 1910, upon the application of Oscar Dressel, of Elberfeld, and Richard Kothe and Heinrich Hoerlein, of Vohwinkel, Germany, for an improvement in "Dyestuffs," an error appears in the printed specification requiring correction as follows: Page 1, line 56, in formula, the symbol "$NH_3$" should read $NH_2$; and that the said Letters Patent should be read with this correction therein that the same may conform to the record of the case in the Patent Office.

Signed and sealed this 7th day of February, A. D., 1911.

[SEAL.]

C. C. BILLINGS,

*Acting Commissioner of Patents.* tained by first combining the above mentioned diazo compounds with such of the above mentioned methylketols which do not contain sulfonic groups and then sulfonating the dyes.

We claim:—

1. The herein described new dyestuffs obtainable by reacting upon sulfonic acids of alpha-methylindol compounds with diazotized aminoarylsulfonamids, which dyes are after being dried and pulverized in the shape of their alkaline salts from yellow to orange-yellow powders soluble in water and in concentrated sulfuric acid with a yellow color; yielding upon treatment with stannous chlorid and hydrochloric acid an aminoarylsulfonamid and an amino-alpha-methylindol sulfonic acid and dyeing wool from acid baths yellow shades, substantially as described.

2. The herein described new dyestuff obtainable by reacting upon alpha-methylindol sulfonic acid with diazotized 4-toluidin-2-sulfonanilid, which is after being dried and pulverized a yellow powder soluble in water and in concentrated sulfuric acid with a yellow color; yielding upon reduction with stannous chlorid and hydrochloric acid 4-toluidin-2-sulfonanilid and amino-alpha-methylindol sulfonic acid and dyeing wool from acid baths brilliant yellow shades, substantially as described.

In testimony whereof we have hereunto set our hands in the presence of two subscribing witnesses.

OSCAR DRESSEL. [L. S.]
RICHARD KOTHE. [L. S.]
HEINRICH HOERLEIN. [L. S.]

Witnesses:
OTTO KÖNIG,
CHAS. J. WRIGHT.

---

It is hereby certified that in Letters Patent No. 978,439, granted December 13, 1910, upon the application of Oscar Dressel, of Elberfeld, and Richard Kothe and Heinrich Hoerlein, of Vohwinkel, Germany, for an improvement in "Dyestuffs," an error appears in the printed specification requiring correction as follows: Page 1, line 56, in formula, the symbol "$NH_3$" should read $NH_2$; and that the said Letters Patent should be read with this correction therein that the same may conform to the record of the case in the Patent Office.

Signed and sealed this 7th day of February, A. D., 1911.

[SEAL.]

C. C. BILLINGS,

*Acting Commissioner of Patents.*

Correction in Letters Patent No. 978,439.

It is hereby certified that in Letters Patent No. 978,439, granted December 13, 1910, upon the application of Oscar Dressel, of Elberfeld, and Richard Kothe and Heinrich Hoerlein, of Vohwinkel, Germany, for an improvement in "Dyestuffs," an error appears in the printed specification requiring correction as follows: Page 1, line 56, in formula, the symbol "$NH_3$" should read $NH_2$; and that the said Letters Patent should be read with this correction therein that the same may conform to the record of the case in the Patent Office.

Signed and sealed this 7th day of February, A. D., 1911.

[SEAL.]

C. C. BILLINGS,

*Acting Commissioner of Patents.*